(12) United States Patent
Zhang et al.

(10) Patent No.: US 10,135,873 B2
(45) Date of Patent: Nov. 20, 2018

(54) DATA SHARING METHOD AND APPARATUS, AND TERMINAL

(71) Applicant: Huawei Technologies Co., Ltd., Shenzhen, Guangdong (CN)

(72) Inventors: Huimin Zhang, Shenzhen (CN); Jiali Fu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 197 days.

(21) Appl. No.: 15/195,935

(22) Filed: Jun. 28, 2016

(65) Prior Publication Data

US 2017/0070537 A1    Mar. 9, 2017

Related U.S. Application Data

(63) Continuation of application No. PCT/CN2014/085406, filed on Aug. 28, 2014.

(30) Foreign Application Priority Data

Dec. 31, 2013 (CN) .......................... 2013 1 0752459

(51) Int. Cl.
*H04L 29/06* (2006.01)
*G06Q 10/10* (2012.01)
*H04W 12/02* (2009.01)
*G06F 21/62* (2013.01)
*H04W 4/02* (2018.01)

(52) U.S. Cl.
CPC ............. *H04L 63/20* (2013.01); *G06F 21/62* (2013.01); *G06Q 10/10* (2013.01); *H04L 63/104* (2013.01); *H04W 12/02* (2013.01); *H04W 4/02* (2013.01)

(58) Field of Classification Search
None
See application file for complete search history.

(56) References Cited

U.S. PATENT DOCUMENTS

| | | | |
|---|---|---|---|
| 2009/0276463 A1 | 11/2009 | Miller | |
| 2010/0318571 A1 | 12/2010 | Pearlman et al. | |
| 2011/0300834 A1 | 12/2011 | Ni | |
| 2012/0023168 A1 | 1/2012 | Koren | |
| 2012/0172050 A1* | 7/2012 | Ledlie .................. | H04W 4/022 455/456.1 |
| 2013/0014266 A1 | 1/2013 | Yeung | |

(Continued)

FOREIGN PATENT DOCUMENTS

| | | |
|---|---|---|
| CN | 101766479 A | 7/2010 |
| CN | 102460502 A | 5/2012 |
| CN | 102811242 A | 12/2012 |

(Continued)

*Primary Examiner* — Brandon S Hoffman

(57) ABSTRACT

The present invention provides a data sharing method and apparatus, and a terminal. The method includes: acquiring shared data, where the shared data is data used to be shared with another person; determining a privacy degree of the shared data; determining a sharing group of the shared data according to the privacy degree, where the sharing group is a group that receives the shared data and includes a terminal allowed to obtain the shared data; and sending the shared data to the sharing group. In this way, in a case in which privacy degrees are different, that is, shared data is different, the shared data is sent to different sharing groups.

15 Claims, 8 Drawing Sheets

(56) References Cited

U.S. PATENT DOCUMENTS

2013/0132477 A1* 5/2013 Bosworth .............. G06Q 50/01
709/204

FOREIGN PATENT DOCUMENTS

| CN | 103095671 A | 5/2013 |
| CN | 103167419 A | 6/2013 |
| CN | 103200696 A | 7/2013 |
| CN | 103369303 A | 10/2013 |
| CN | 103761083 A | 4/2014 |

* cited by examiner

DATA SHARING METHOD AND APPARATUS, AND TERMINAL

CROSS-REFERENCE TO RELATED APPLICATIONS

This application is a continuation of International Application No. PCT/CN2014/085406, filed on Aug. 28, 2014, which claims priority to Chinese Patent Application No. 201310752459.2, filed on Dec. 31, 2013, both of which are hereby incorporated by reference in their entireties.

TECHNICAL FIELD

The present invention relates to the field of data processing technologies, and in particular, to a data sharing method and apparatus, and a terminal.

BACKGROUND

A wearable device developed by performing intelligent design on an everyday wearing device by using a wearable technology is called a "wearable terminal", for example, a pair of glasses and various multifunctional watches. The wearable technology has attracted much attention in international computer academic circles and industrial circles. However, due to high construction costs and technological complexity, many wearable terminals stay only in the conceptual field. With the development of the mobile Internet, the progress of technologies, the launch of processing chips with high performance and low power consumption, and the like, some wearable terminals have evolved from being conceptualized to being commercialized, and the wearable terminals keep appearing, such as Google Glass, Apple Watch, and some wearable terminals that can collect physical sign data of users. A Zephyr BioModule fitness suit is used as an example. A round biological sensor (BioModule) is disposed in a chest position of the fitness suit, and an accelerator that can monitor a movement and speed is disposed in the biological sensor, to measure a heart rate, a breathing rate, and skin temperature of a user.

Therefore, with the popularization of wearable terminals, data sharing between terminal users is not limited to only conventional picture sharing and blog article sharing. Physical sign data of the users can also be shared. Sharing objects corresponding to different data may be different. Based on this requirement, one technical problem to be resolved urgently by a person skilled in the art is how to propose a data sharing method in an innovative manner, to share different shared data to different sharing objects.

SUMMARY

The present invention provides a data sharing method and apparatus, and a terminal, which are used to send different shared data to terminals of different sharing groups, so that sharing objects using the terminals can view the shared data, to send different shared data to different sharing objects. Technical solutions are as follows: According to a first aspect, an embodiment of the present invention provides a data sharing method, including:

acquiring shared data, where the shared data is data used to be shared with another person;

determining a privacy degree of the shared data;

determining a sharing group of the shared data according to the privacy degree, where the sharing group is a group that receives the shared data and includes a terminal allowed to obtain the shared data; and sending the shared data to the sharing group.

In a first possible implementation manner of the first aspect, the method further includes: adjusting the sharing group according to an intimacy degree with the terminal allowed to obtain the shared data, where the intimacy degree is determined according to a quantity of times of evaluation performed by the terminal allowed to obtain the shared data on the shared data or previously acquired shared data. With reference to the first possible implementation manner of the first aspect, in a second possible implementation manner of the first aspect, the adjusting the sharing group according to an intimacy degree with the terminal allowed to obtain the shared data includes:

acquiring the quantity of times of evaluation performed by the terminal allowed to obtain the shared data on the shared data or previously acquired shared data; and increasing an intimacy degree of the terminal if the quantity of times of evaluation increases to a first evaluation threshold; and if an increased intimacy degree reaches a first intimacy threshold, adjusting a terminal corresponding to the increased intimacy degree to a corresponding sharing group;

or decreasing an intimacy degree of the terminal if the quantity of times of evaluation decreases to a second evaluation threshold; and if a decreased intimacy degree reaches a second intimacy threshold, adjusting a terminal corresponding to the decreased intimacy degree to a corresponding sharing group.

In a third possible implementation manner of the first aspect, the method further includes: determining, according to a device parameter of a terminal, a sharing manner for sending the shared data; or determining, according to a data priority of the shared data, a sharing manner for sending the shared data; or obtaining a total weighted value by performing weighting processing separately on a device parameter of a terminal and a data priority of the shared data, and comparing the total weighted value with a threshold of each sharing manner, to obtain the sharing manner corresponding to the total weighted value.

With reference to the third possible implementation manner of the first aspect, in a fourth possible implementation manner of the first aspect, the device parameter of the terminal includes at least one of an Internet access manner, an Internet speed, an electric quantity, and a fee, to determine the sharing manner corresponding to the device parameter, where the terminal is a first terminal that sends the shared data to the sharing group or a second terminal that receives the shared data and that is in the sharing group.

In a fifth possible implementation manner of the first aspect, when the shared data is physical sign data, the method further includes:

determining a state of a user using a terminal, where the user state is used to indicate a current state of the user, and the terminal of which the user state is determined is a terminal that sends the shared data;

determining an emergency degree of the shared data by using the user state; and selecting a sharing manner corresponding to the emergency degree of the shared data.

With reference to the fifth possible implementation manner of the first aspect, in a sixth possible implementation manner of the first aspect, the determining a state of a user using a terminal that sends the shared data includes: using the acquired user state directly as the user state of the terminal that sends the shared data; or acquiring a location at which the user of the terminal that sends the shared data is located and a current time while acquiring the user state of the terminal that sends the shared data, and determining the final user state according to the location at which the user is located, the current time, and the user state.

With reference to the first aspect or any one possible implementation manner of the first possible implementation manner to the sixth possible implementation manner of the first aspect, in a seventh possible implementation manner of the first aspect, the determining a privacy degree of the shared data includes:

identifying, by using a text identification technology and a picture identification technology, shared content included in the shared data, and determining, according to an information confidentiality degree of the shared content, a privacy degree corresponding to the shared data; or the identifying a privacy degree of the shared data includes: determining, by using a data type of the shared data, a privacy degree corresponding to the data type.

According to a second aspect, an embodiment of the present invention further provides a data sharing apparatus, including:

an acquiring unit, configured to acquire shared data, where the shared data is data used to be shared with another person;

a determining unit, configured to determine a privacy degree of the shared data;

a group selection unit, configured to determine a sharing group of the shared data according to the privacy degree, where the sharing group is a group that receives the shared data and includes a terminal allowed to obtain the shared data; and a sending unit, configured to send the shared data to the sharing group.

In a first possible implementation manner of the second aspect, the apparatus further includes: an adjusting unit, configured to adjust the sharing group according to an intimacy degree with the terminal allowed to obtain the shared data, where the intimacy degree is determined according to a quantity of times of evaluation performed by the terminal allowed to obtain the shared data on the shared data or previously acquired shared data.

With reference to the first possible implementation manner of the second aspect, in a second possible implementation manner of the second aspect, the adjusting unit includes:

an acquiring subunit, configured to acquire the quantity of times of evaluation performed by the terminal allowed to obtain the shared data on the shared data or previously acquired shared data;

a first comparing subunit, configured to increase an intimacy degree of the terminal if the quantity of times of evaluation increases to a first evaluation threshold; and a first adjusting subunit, configured to: in a case in which an increased intimacy degree obtained by increasing an intimacy degree in the first comparing subunit reaches a first intimacy threshold, adjust a terminal corresponding to the increased intimacy degree to a corresponding sharing group; or a second comparing subunit, configured to decrease an intimacy degree of the terminal if the quantity of times of evaluation decreases to a second evaluation threshold; and a second adjusting subunit, configured to: in a case in which a decreased intimacy degree obtained by decreasing an intimacy degree in the second comparing subunit reaches a second intimacy threshold, adjust a terminal corresponding to the decreased intimacy degree to a corresponding sharing group.

In a third possible implementation manner of the second aspect, the apparatus further includes: a sharing manner selection unit, specifically configured to determine, according to a device parameter of a terminal, a sharing manner for sending the shared data; or determine, according to a data priority of the shared data, a sharing manner for sending the shared data; or obtain a total weighted value by performing weighting processing separately on a device parameter of a terminal and a data priority of the shared data, and compare the total weighted value with a threshold of each sharing manner, to obtain the sharing manner corresponding to the total weighted value.

With reference to the third possible implementation manner of the second aspect, in a fourth possible implementation manner of the second aspect, the device parameter of the terminal includes at least one of an Internet access manner, an Internet speed, an electric quantity, and a fee, to determine the sharing manner corresponding to the device parameter, where the terminal is a first terminal that sends the shared data to the sharing group or a second terminal that receives the shared data and that is in the sharing group.

In a fifth possible implementation manner of the second aspect, when the shared data is physical sign data, the apparatus further includes:

a state acquiring unit, configured to determine a state of a user using a terminal, where the user state is used to indicate a current state of the user;

an emergency degree acquiring unit, configured to determine an emergency degree of the shared data by using the user state; and a sharing manner selection unit, configured to select a sharing manner corresponding to the emergency degree of the shared data.

With reference to the fifth possible implementation manner of the second aspect, in a sixth possible implementation manner of the second aspect, the state acquiring unit is specifically configured to use the acquired user state directly as the user state of the terminal that sends the shared data; or acquire a location at which the user of the terminal that sends the shared data is located and a current time while acquiring the user state of the terminal that sends the shared data, and determine the final user state according to the location at which the user is located, the current time, and the user state.

With reference to the second aspect or any one possible implementation manner of the first possible implementation manner to the sixth possible implementation manner of the second aspect, in a seventh possible implementation manner of the second aspect, the determining unit is specifically configured to:

identify, by using a text identification technology and a picture identification technology, shared content included in the shared data, and determine, according to an information confidentiality degree of the shared content, a privacy degree corresponding to the shared data; or the determining unit is specifically configured to determine, by using a data type of the shared data, a privacy degree corresponding to the data type.

According to a third aspect, an embodiment of the present invention further provides a terminal, including:

a transceiver communications module, configured to send shared data to a sharing group and acquire shared data from another wearable terminal;

a terminal state collection module, configured to collect a state of the terminal to assist in determining a sharing manner;

a data collection module, configured to collect data;

a sharer information perceiving module, configured to perform identification and prediction according to the data in the data collection module, to obtain an environment in which a sharer is located;

a sharing determining module, configured to determine a sharing group and a sharing manner; and an interface display and sharer interaction module, configured to provide a graphical user interface.

According to the data sharing method provided by embodiments of the present invention, after shared data is acquired, a privacy degree of the shared data may be first determined, and further a sharing group of the shared data is determined according to the privacy degree. In this way, in a case in which privacy degrees are different, that is, shared data is different, the shared data is sent to different sharing groups. The sharing group includes a terminal allowed to obtain the shared data, and the shared data is sent to the terminal, and viewed by a user of the terminal, namely a sharing object, thereby sharing different shared data to different sharing objects.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
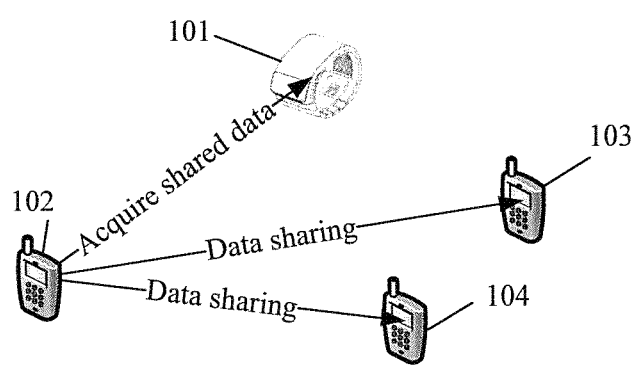
FIG. 1 is a schematic diagram of a data sharing system according to an embodiment of the present invention.

First, a data sharing system on which a data sharing method provided by an embodiment of the present invention is based is described. As shown in FIG. 1, 101 represents a wearable terminal configured to collect shared data, for example, physical sign data and/or environment data of a user of the wearable terminal 101, namely a sharer, or may certainly be more or any one of a picture, a video, a blog article, and a log of a sharer; 102 represents a terminal that can acquire data of the sharer from the wearable terminal as shared data, and automatically perform data sharing. 103 and 104 represent terminals that are located in a same sharing group and receive the shared data sent by the terminal 102. The terminal may be another wearable terminal, a mobile phone, a computer, a PAD, or the like. A user of the terminal, namely a sharing object, may be a relative or a friend of the user of the wearable terminal 101, namely the sharer, or may be a professional group, such as doctors and health experts. In an entire data sharing process, a user may not participate in the operation; instead sharing is completely automatically performed between the terminals.

Figure 2:
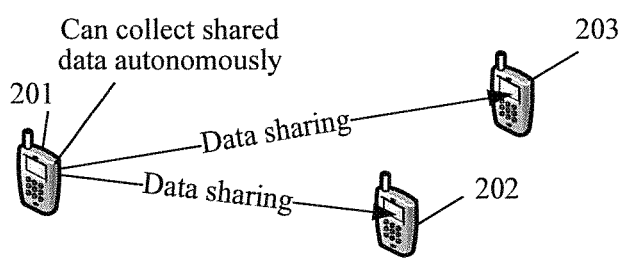
FIG. 2 is another schematic diagram of a data sharing system according to an embodiment of the present invention.

For a schematic diagram of another data sharing system, reference may be made to FIG. 2. Different from the system shown in FIG. 1, in the system shown in FIG. 2, a terminal 201 is a wearable terminal that can collect shared data and automatically perform data sharing. The terminal 201 performs data sharing with a terminal 202 and a terminal 203 that are located in different sharing groups in the system.

Figure 3:
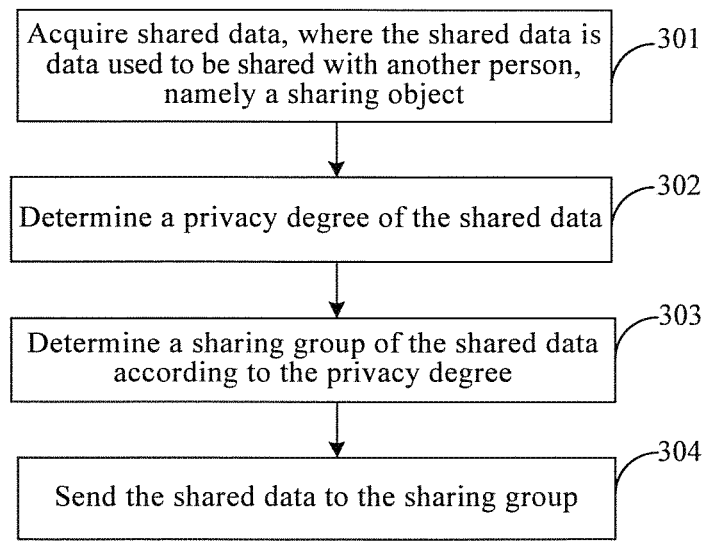
FIG. 3 is a flowchart of a data sharing method according to an embodiment of the present invention.

Based on but not limited to the systems shown in FIG. 1 and FIG. 2, for the data sharing method provided by this embodiment of the present invention, refer to FIG. 3. The data sharing method may be applied to the terminal 101 shown in FIG. 1 or the terminal 201 shown in FIG. 2. For ease of description of the data sharing method provided by this embodiment of the present invention, a terminal that sends shared data is called a first terminal, and a terminal that is located in a sharing group and is allowed to obtain the shared data is called a second terminal. The data sharing method may include the following steps:

Step 301: Acquire shared data, where the shared data is data used to be shared with another person, namely a sharing object. In this embodiment of the present invention, the shared data may be physical sign data, geographic location data, multimedia data, or the like.

The physical sign data may include at least one type of data of the following data: a body temperature, a blood pressure, blood oxygen, a heartbeat, breath, pulse, height, weight, and a medical history. The physical sign data may further include a physical sign indicator of a sharer in a normal state, which is used to perform comparison and analysis on physical sign data of the sharer in a current state and the physical sign indicator of the sharer in a normal state.

It can be understood that the physical sign data indicates a physical state of the sharer in a current state, and therefore the physical sign data generally needs to be collected in real time. In this embodiment of the present invention, the first terminal may be equipped with a sensor for measuring various physical sign parameters, so as to collect the physical sign data of the sharer. Certainly, the first terminal may also acquire the physical sign data from another wearable terminal. A wearable watch is used as an example. If the sharer wears a wearable watch that can collect physical sign data, the first terminal may acquire the physical sign data by means of communication with the wearable watch.

The geographic location used as shared data may be directly acquired by a GPS (Global Positioning System, Global Positioning System), a gyroscope, WIFI (wireless fidelity, Wireless Fidelity), or the like of the first terminal. Optionally, the first terminal may likewise acquire the geographic location from a wearable terminal that can collect a geographic location in which the sharer is located. The multimedia data may include at least one of a picture, a video, a blog article, WeChat, and a log, where the picture and the video may be directly shot by a terminal, and the picture, the video, the blog article, the WeChat, and the log may also be acquired by the first terminal from another terminal and stored by the first terminal. The multimedia data may be specified by the sharer as shared data, or whether the multimedia data can be used as shared data may be determined by the first terminal by automatically identifying content in the multimedia data.

Step 302: Determine a privacy degree of the shared data. The privacy degree of the shared data indicates a confidentiality degree of the shared data.

In this embodiment of the present invention, the privacy degree of the shared data may be set by a user of the first terminal. The privacy degree of the shared data may also be determined in the following manner: the first terminal identifies, by means of automatic identification by using a text identification technology and a picture identification technology, shared content included in the shared data, and determines the privacy degree of the shared data according to an information confidentiality degree of the shared content, where the information confidentiality degree of the shared content indicates a degree of a personal secret of the sharer included in the shared content.

If the shared data is multimedia data, specific content included in the multimedia data may be identified by using a picture identification technology. If the multimedia data includes shared content, such as person information, causing leakage of confidential information, it is determined that the multimedia data has a high privacy degree; otherwise, it is determined that the multimedia data has a relatively low privacy degree.

If the shared data is text data, a text identification technology may be used to identify which texts are included in the text data. If these texts include confidential texts, namely texts causing leakage of confidential information of the sharer, it is determined that the text data has a high privacy degree.

Further, the privacy degree may also be set according to a data type of the shared data. For example, the privacy degree of the shared data may be set to high, medium, or low privacy degree, where a privacy degree of geographic location data is higher than a privacy degree of a scenery video or a scenery picture, but is lower than a privacy degree of physical sign data.

In this embodiment of the present invention, the data type may be identified by using, but not limited to, the following two feasible manners. One feasible manner is that: when the first terminal can collect the shared data, the first terminal may perform identification according to a type of a sensor; specifically, data collected by a physical sign sensor is physical sign data, data acquired by a GPS is geographic location data, and what are shot by a camera lens are a picture and a video in multimedia data. The physical sign sensor may use an existing sensor chip used for collecting physical sign data, for example, a blood oxygen detection and heart rate detection sensor chip and an electro-cardio chip inserted for supporting "electro-cardio energy" detection.

Another feasible manner is that: identification is performed according to a form of the shared data; specifically, when the shared data is a value, it is determined that the shared data is physical sign data; when the shared data is a coordinate or longitude and latitude, it is determined that the shared data is geographic location data; if the shared data is a relatively small binary file, it is determined that the shared data is a picture; and if the shared data is a relatively large binary file, it is determined that the shared data is a video. This type of identification performed according to the form of the shared data is applicable to a first terminal that can collect the shared data autonomously and a first terminal that can acquire the shared data from another wearable terminal.

Step 303: Determine a sharing group of the shared data according to the privacy degree. The sharing group is a group that receives the shared data and includes a second terminal allowed to obtain the shared data.

After identifying the privacy degree, the first terminal may autonomously determine which sharing group to share the shared data. In addition, the sharing group may also be configured by default according to the privacy degree, and may specifically be set by using Table 1. Table 1 is a table of a correspondence between a privacy degree and a sharing group.

TABLE 1

Table of a correspondence between a privacy degree and a sharing group

| Sharing object | Privacy degree | | | |
| --- | --- | --- | --- | --- |
| | Physical sign data | Geographic location | Picture | Video |
| Parents and children | High | Medium | Person: medium/scenery: low | Person: medium/scenery: low |
| Relatives | High | Medium | Person: medium/scenery: low | Person: medium/scenery: low |
| Professional group | High | High | Person: high/scenery: low | Person: high/scenery: low |
| Friend | High | Medium | Person: medium/scenery: low | Person: medium/scenery: low |

Further, during a default configuration, a specified group may further be configured, and some shared data with a relatively high privacy degree is shared to the specified group. For example, a specified group may be configured for physical sign data. Certainly, when the privacy degree is determined according to the data type of the shared data, in this embodiment of the present invention, the sharing group may also be determined according to the data type and the privacy degree, which is specifically as follows: first, a corresponding privacy degree is determined according to the data type, and then a final sharing group is determined according to the privacy degree, as shown in Table 2. Table 2 is a table of a correspondence among a data type, a privacy degree, and a sharing group. In Table 2, Y indicates that obtaining is allowed, and N indicates that obtaining is not allowed.

TABLE 2

Table of a correspondence among a data type, a privacy degree, and a sharing group

| Sharing group | Sharing object | Data type and privacy degree | | | |
|---|---|---|---|---|---|
| | | Physical sign data (with a high privacy degree) | Geographic location (with a medium privacy degree) | Person video/picture (with a medium privacy degree) | Scenery video/picture (with a low privacy degree) |
| A | Parents and children | Y | Y | Y | Y |
| B | Friends | N | Y | Y | Y |
| C | Everyone | N | N | N | Y |

Step 304: Send the shared data to the sharing group. When sending the shared data to the second terminal in the sharing group, the first terminal uses information about a sharing object that logs in to the second terminal as a receiving address of the shared data, and sends the shared data. The information about the sharing object may include WeChat account information, Weibo account information, or the like of the sharing object.

By using the foregoing technical solution, after acquiring shared data, a first terminal may first determine a privacy degree of the shared data, and further determine a sharing group of the shared data according to the privacy degree. In this way, in a case in which privacy degrees are different, that is, shared data is different, the shared data is sent to different sharing groups. The sharing group includes a second terminal allowed to obtain the shared data, and the shared data is sent to the second terminal, and viewed by a user of the second terminal, namely a sharing object, thereby sharing different shared data to different sharing objects.

In addition, when performing data sharing, the first terminal may further adjust the sharing group by applying the data sharing method provided by this embodiment of the present invention. One feasible manner is adjusting the sharing group according to an intimacy degree with the terminal allowed to obtain the shared data. One feasible manner for determining the intimacy degree is determining according to a quantity of times of evaluation performed by the second terminal allowed to obtain the shared data on the shared data, namely a quantity of times of evaluation performed by the second terminal on a same piece of acquired shared data, where the shared data is currently acquired data.

Another feasible manner for determining the intimacy degree is determining according to a quantity of times of evaluation performed by the second terminal allowed to obtain the shared data on previously acquired shared data, namely a quantity of times of evaluation performed by the second terminal on all previously acquired shared data, where all the shared data is different from data currently acquired by the second terminal.

Still another feasible manner for determining the intimacy degree is determining according to a quantity of times of evaluation performed by the second terminal allowed to obtain the shared data on currently acquired shared data and previously acquired other shared data.

Figure 4:
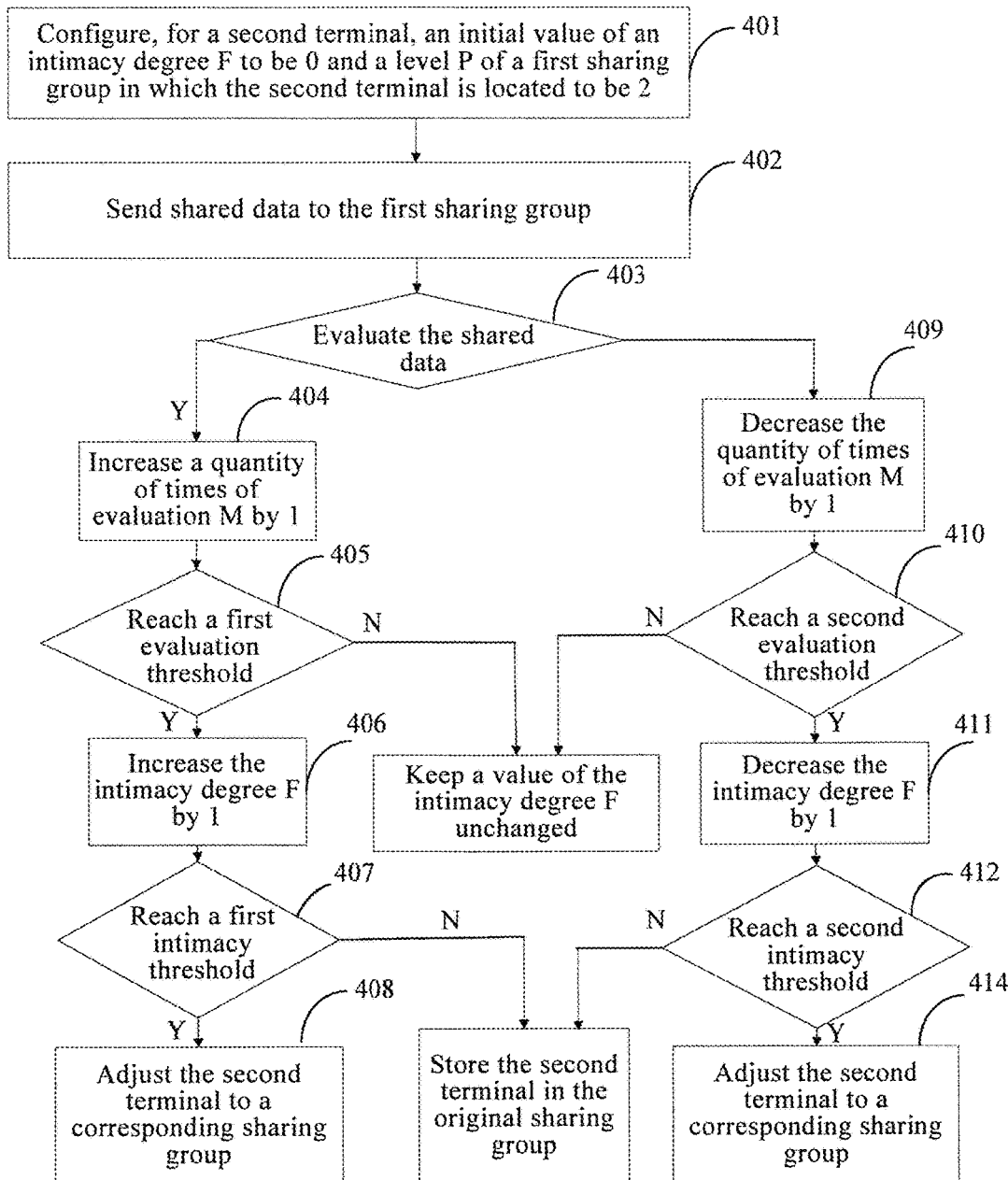
FIG. 4 is a flowchart of a data sharing method according to an embodiment of the present invention.

In this embodiment of the present invention, an adjusting process of the quantity of times of evaluation may be as follows: an initial value of the intimacy degree is set for the second terminal; when the quantity of times of evaluation increases to a threshold, the intimacy degree is increased by 1, and when the intimacy degree increases to a threshold, the second terminal is moved to a sharing group; when the quantity of times of evaluation decreases to a threshold, the intimacy degree is decreased by 1, and when the intimacy degree decreases to a threshold, the second terminal is moved to another sharing group, so that a larger quantity of times of evaluation leads to a higher intimacy degree, and corresponding sharing groups are different. Further, different levels may further be set for sharing groups, so that a higher intimacy degree leads to a higher level of a sharing group, indicating that a relationship between a sharer and a sharing object is closer. For a specific process, reference may be made to FIG. 4, where the intimacy degree is determined according to a quantity of times of evaluation performed on a same piece of shared data, which may include the following steps: Step 401: Configure, for a second terminal, an initial value of an intimacy degree F. to be 0 and a level P of a first sharing group in which the second terminal is located to be 2.

Step 402: Send shared data to the first sharing group.

Step 403: Determine whether the second terminal evaluates the shared data, where if yes, perform step 404; if not, perform step 409.

It can be understood that evaluation performed by the second terminal on the shared data is dependent on evaluation performed by a sharing object on the shared data. After evaluating the shared data, the sharing object uploads, by using the second terminal, evaluation to a first terminal for displaying. Therefore, the first terminal may determine a quantity of times of evaluation by using uploaded evaluation content. When the evaluation content is empty, it indicates that the second terminal has not evaluated the shared data. Otherwise, it indicates that the second terminal evaluates the shared data.

Step 404: Increase a quantity M of times of evaluation by 1.

Step 405: Determine whether the quantity M of times of evaluation reaches a first evaluation threshold, where if yes, perform step 406; if not, keep the value of the intimacy degree F. unchanged. Step 406: Increase the intimacy degree F. by 1. If the quantity M of times of evaluation reaches the first evaluation threshold, it indicates that an intimacy degree between a user of the second terminal, namely a sharing object, and a sender of the shared data, namely a sharer, increases. In this case, the intimacy degree is increased by 1.

Step 407: Determine whether the intimacy degree F. reaches a first intimacy threshold, where if yes, perform step 408; if not, proceed to store the second terminal in the original sharing group. When the intimacy degree F. reaches the first intimacy threshold, it indicates that a level of a sharing group in which the second terminal is located rises. In this case, the second terminal needs to be moved to a sharing group with a higher level.

Step 408: Adjust the second terminal to a corresponding sharing group, and delete the same second terminal in the original sharing group.

Step 409: Determine whether the quantity M of times of evaluation decreases to a second evaluation threshold, where if yes, perform step 410; if not, keep the value of the intimacy degree F. unchanged.

Step 410: Decrease the intimacy degree F. by 1. If the quantity M of times of evaluation reaches the second evaluation threshold, it indicates that the intimacy degree between the sharing object and the sharer decreases. In this case, the intimacy degree is decreased by 1.

Step 411: Determine whether the intimacy degree F. reaches a second intimacy threshold, where if yes, perform step 412; if not, proceed to store the second terminal in the original sharing group. Step 412: Adjust the second terminal to a corresponding sharing group, where an adjusting process may be determined according to a level of a sharing group corresponding to an intimacy degree of the second terminal.

The foregoing first evaluation threshold, first intimacy threshold, second evaluation threshold, and second intimacy threshold may be set according to different application scenarios, and values thereof are not limited in this embodiment of the present invention. According to the foregoing manners, dynamic adjustment of a sharing group is implemented, so that second terminals in a sharing group at different moments are different, and consequently when sending a same piece of shared data at different moments, the first terminal may send the same piece of shared data to the different second terminals, thereby sharing a same piece of shared data between different sharing objects.

Certainly, in addition to the foregoing automatic adjustment of the sharing object, adjustment may also be performed by a user of the first terminal, namely a sharer, which may specifically be that: the first terminal displays the second terminal in the sharing group to the sharer, and the sharer selects information about a final sharing object.

Further, when the first terminal displays the second terminal, display may also be performed according to a result obtained after ranking is performed on sharing possibilities or sharing correlations, where a second terminal having a larger value of a sharing possibility or a sharing correlation is displayed in the front. The sharing possibility is a possibility of evaluation performed by a user of the second terminal, namely a sharing object, on the shared data, and the sharing correlation is a correlation between the shared data and the user of the second terminal, namely the sharing object. For example, a sharing object that has a relatively high sharing correlation with physical sign data is a doctor.

In addition, in all the foregoing method embodiments, a terminal may further first determine a sharing manner of shared data, and then send, in the determined sharing manner, a sharing data to a terminal with which information about each sharing object is associated. The so-called sharing manner is which sending method is used to send the shared data.

The following lists several feasible methods for determining a sharing manner. The data sharing method provided by this embodiment of the present invention includes but is not limited to the following feasible methods:

A first one is determining the sharing manner according to a device parameter of a first terminal, where the first terminal is a sending terminal of the shared data, and the device parameter may include at least one of an Internet access manner, an Internet speed, an electric quantity, and a fee. A specific determining process may be as follows: if the first terminal accesses the Internet for free by means of WIFI currently, because a transmission rate of WIFI is high, a sharing manner featuring high quality and big data may be used to send the shared data, for example, a video sharing manner; if the first terminal accesses the Internet in a GPRS (General Packet Radio Service, General Packet Radio Service) manner, because a transmission rate of GPRS is low, a text manner may be used for sharing. If a current available Internet speed of the first terminal is high, a video manner may be used for sharing, and if the available Internet speed is low, a text manner may be used for sharing. If an electric quantity of the first terminal is relatively low currently, an SMS message manner may be used to send the shared data; and if an available fee of a SIM (Subscriber Identity Module, subscriber identity module) card in the first terminal is low currently, an SMS message manner may be used to send the shared data.

A second one is determining the sharing manner according to a device parameter of the second terminal. For details, reference may be made to the first determining manner. The second terminal is a receiving terminal of the shared data.

Further, the second terminal may further determine a receiving manner according to the device parameter of the second terminal. For example, if an Internet speed used by the second terminal is relatively low, or an electric quantity of the second terminal is relatively low, or an Internet access fee of the second terminal is relatively high, skipping receiving may be selected temporarily; if a screen of the second terminal is relatively small, and the screen can be connected to a terminal with a larger screen, the shared data may be sent to the terminal with a larger screen for displaying, to obtain better sharing experience.

A third one is determining the sharing manner according to a data priority of the shared data, where a higher data priority indicates more emergent shared data. In this case, the shared data may be sent in a telephone manner or an SMS message manner, or an emergency center may be directly called. A lower data priority indicates non-emergent shared data, and in this case a sharing manner is not limited.

The data priority is mainly used for physical sign data, and may be determined according to a state of a user using the first terminal. A specific manner may be that: after the user state of the first terminal is obtained, physical sign data in the state is compared with a normal indicator in the state to determine an emergency degree of the shared data, and then a data priority is further determined. When the emergency degree is higher, a data priority corresponding to the emergency degree is higher. The user state of the first terminal includes a static state, a walking state, and a violent exercising state.

A fourth one is using a data priority of the shared data and a device parameter of a terminal, where the terminal may be the first terminal or the second terminal. The manner may specifically be that: the sharing manner is determined according to a sharing manner mapping table shown in Table 3, or may be configured by default or configured in a personalization manner.

TABLE 3

| Sharing manner mapping table | | | | |
|---|---|---|---|---|
| Internet speed | Fee | Electric quantity | Data priority | Sharing manner |
| High | Low | High | Low | Video |
| Low | High | Low | High | SMS message |

The foregoing device parameter of the first terminal, device parameter of the second terminal, and data priority of the shared data may be collectively called a sharing factor. Certainly, in this embodiment of the present invention, the sharing factor includes but is not limited to the foregoing several factors. When the sharing manner is being determined, weighting calculation may further be performed on the sharing factor. After a total weighted value is obtained, the total weighted value is compared with a threshold of each sharing manner, to obtain a sharing manner corresponding to the total weighted value. The sharing manner includes a video manner, a text manner, an SMS message manner, a telephone manner, and the like. The threshold of each sharing manner may be set according to different privacy degrees, and a specific value of the threshold is not limited in this embodiment of the present invention.

Figure 5:
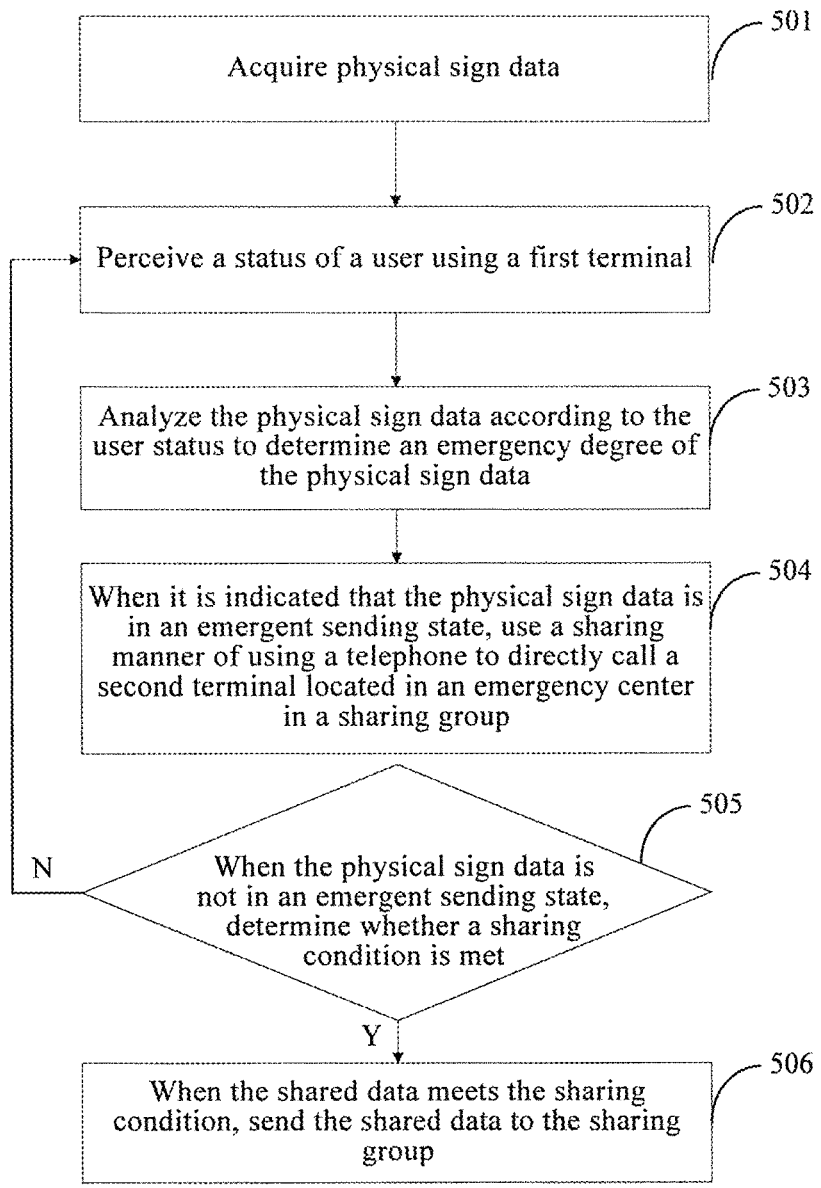
FIG. 5 is another flowchart of a data sharing method according to an embodiment of the present invention.

The following uses an example in which shared data is physical sign data and a privacy degree is preset by a terminal to describe in detail a data sharing method provided by an embodiment of the present invention. A flowchart of the data sharing method is shown in FIG. 5, and the data sharing method may include the following steps: Step 501: Acquire physical sign data. A first terminal may be equipped with a sensor for measuring physical sign information, such as a blood pressure and pulse, so as to collect physical sign data of a user of the first terminal, namely a sharer. Optionally, the first terminal may also acquire the physical sign data from another wearable terminal. A wearable watch is used as an example. If the user wears a wearable watch, which can collect the physical sign data, the first terminal may communicate with the wearable watch and acquire the physical sign data of the user.

Step 502: Perceive a state of a user using the first terminal. Specifically, an acceleration sensor may be used to perceive a vibration condition of a device, so as to predict a user state, which is, for example, a static state, a walking state, a violent exercising state, or the like. When the first terminal collects the physical sign data autonomously, the device is the first terminal. When the first terminal acquires the physical sign data from a wearable terminal, the device is the wearable terminal.

Optionally, the first terminal may further precisely predict information about the user state according to a location at which the user is located, a current time, and the predicted user state. For example, if it is perceived that the current time is 7 o'clock in the evening, and the user is currently located in a park, then the user state is walking state information, and further it may be predicted that the user is currently walking outdoors. The location at which the user is located may be acquired by using a GPS, a gyroscope, or WIFI on a collection device of physical sign data.

Step 503: Analyze the physical sign data according to the user state to determine an emergency degree of the physical sign data. It can be understood that, when the user is in different states, a difference may exist in the acquired physical sign data. Therefore, when a physical condition of the user is being analyzed, analysis further needs to be performed in combination with a current state in which the user is in. For example, when it is perceived that the user is in an outdoor walking state, comparison and analysis are performed on a normal physical sign indicator of the sharer in a normal walking state and currently acquired physical sign data; if it is perceived that the user is in a violent exercising state, comparison and analysis are performed on a normal physical sign indicator of the user in a violent exercising state and currently acquired physical sign data.

By performing analysis on physical sign data of the user in a current state and a normal physical sign indicator in the state, an emergency degree of the current physical sign data may be obtained, that is, whether the physical sign data is in an emergent sending state is determined.

Step 504: When the emergency degree of the physical sign data indicates that the physical sign data is in an emergent sending state, the first terminal may use a sharing manner of using a telephone to directly call a second terminal that is located in an emergency center in a sharing group, and send the physical sign data by using a telephone line. After the telephone is put through, the second terminal in the emergency center automatically plays the physical sign data.

Step 505: When the emergency degree of the physical sign data indicates that the physical sign data is not in an emergent sending state, further determine whether a sharing condition is met, where if yes, perform step 506; if not, return to perform step 502.

The sharing condition is used to indicate when data sharing is performed, which may be real time sharing, or may be sharing by means of periodic summarization, for example, sharing is performed by means of summarization once a day. Certainly, if the emergency degree of the physical sign data indicates that the physical sign data is not in an emergent sending state, the first terminal may directly return to perform step 502.

Step 506: When the shared data meets the sharing condition, send the shared data to the sharing group.

Further, when the shared data meets the sharing condition, the first terminal may further determine a sharing manner, and send the shared data by using the sharing manner. For the determining of the sharing manner, reference may be made to the related description in the foregoing method embodiments, and details are not repeatedly described in this embodiment of the present invention.

Figure 6:
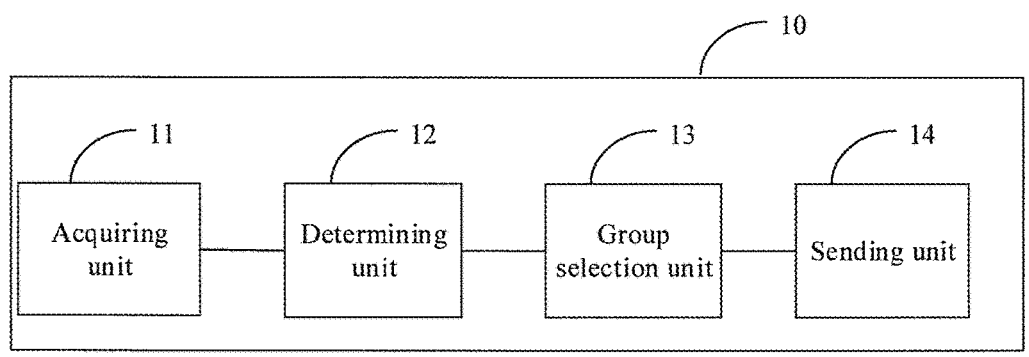
FIG. 6 is a schematic structural diagram of a data sharing apparatus according to an embodiment of the present invention.

Corresponding to the foregoing method embodiments, an embodiment of the present invention further provides a data sharing apparatus 10. A schematic structural diagram of the data sharing apparatus 10 is shown in FIG. 6. The data sharing apparatus 10 may include an acquiring unit 11, a determining unit 12, a group selection unit 13, and a sending unit 14.

The acquiring unit 11 is configured to acquire shared data, where the shared data is data used to be shared with another person. In this embodiment of the present invention, the shared data may be physical sign data, geographic location data, multimedia data, or the like. For which data the shared data may specifically be, refer to related description in the method embodiments.

The determining unit 12 is configured to determine a privacy degree of the shared data. In this embodiment of the present invention, the privacy degree of the shared data may be set by a user of a terminal. The privacy degree of the shared data may further be automatically identified by a first terminal. For example, the determining unit is specifically configured to identify, by using a text identification technology and a picture identification technology, shared content included in the shared data, and determine, according to an information confidentiality degree of the shared content, a privacy degree corresponding to the shared data.

Alternatively, the determining unit 12 may also be specifically configured to determine, by using a data type of the shared data, a privacy degree corresponding to the data type. Identification of the data type may be determined according to a type of a sensor or a data form. For details, refer to the description in the method embodiments.

The group selection unit 13 is configured to determine a sharing group of the shared data according to the privacy degree, where the sharing group is a group that receives the shared data and includes a terminal allowed to obtain the shared data. The terminal is a terminal that receives the shared data, which is called a second terminal for short.

After identifying the privacy degree, the determining unit 12 in the first terminal may trigger the group selection unit 13 to autonomously determine which sharing group to share the shared data. In addition, the group selection unit 13 may also determine the sharing group according to a sharing group configured by default according to the privacy degree. Specifically, the group selection unit 13 may set the sharing group by using Table 1. Table 1 is a table of a correspondence between a privacy degree and a sharing group. The first terminal is a terminal that sends the shared data.

Certainly, when the privacy degree is determined according to the data type of the shared data, in this embodiment of the present invention, the sharing group may be further determined according to the data type and the privacy degree, which is specifically as follows: first, a corresponding privacy degree is determined according to the data type, and then a final sharing group is determined according to the privacy degree, as shown in Table 2, where Table 2 is a table of a correspondence among a data type, a privacy degree, and a sharing group.

The sending unit 14 is configured to send the shared data to the sharing group. When the shared data is sent to the second terminal in the sharing group, information about a sharing object that logs in to the second terminal is used as a receiving address of the shared data, and then the shared data is sent. The information about the sharing object may include WeChat account information, Weibo account information, or the like of the sharing object.

Figure 7:
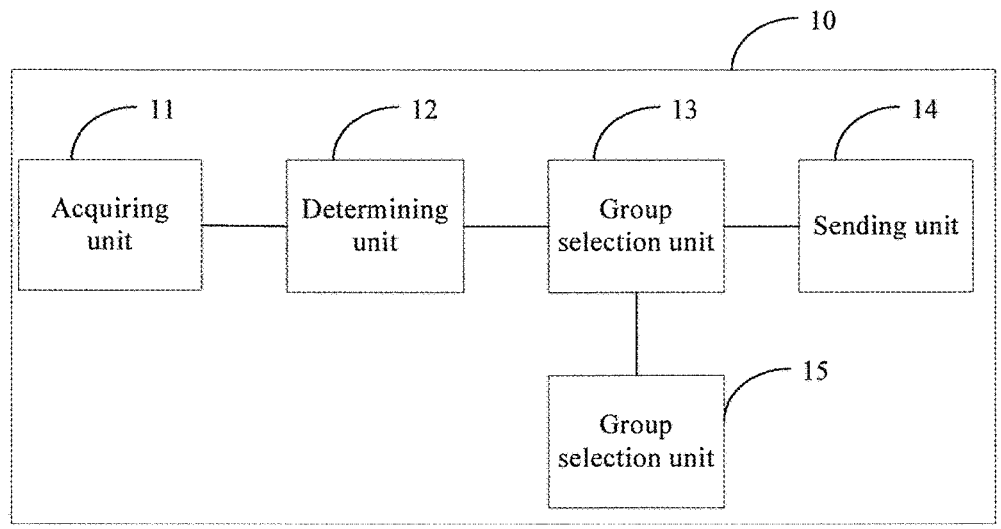
FIG. 7 is another schematic structural diagram of a data sharing apparatus according to an embodiment of the present invention.

Referring to FIG. 7, FIG. 7 shows another schematic structural diagram of a data sharing apparatus 10 according to an embodiment of the present invention. On a basis of FIG. 6, the data sharing apparatus 10 further includes: an adjusting unit 15, configured to adjust the sharing group according to an intimacy degree with the terminal allowed to obtain the shared data, where the intimacy degree is determined according to a quantity of times of evaluation performed by the second terminal allowed to obtain the shared data on the shared data or previously acquired shared data.

That is, the adjusting unit 15 may perform determining according to a quantity of times of evaluation performed on a same piece of acquired shared data, where the shared data is currently acquired data. The adjusting unit 15 may also perform determining according to a quantity of times of evaluation performed on all previously acquired shared data, where all the shared data is different from data currently acquired by the second terminal. The adjusting unit 15 may also perform determining according to a quantity of times of evaluation performed by the second terminal allowed to obtain the shared data on currently acquired shared data and previously acquired other shared data.

Figure 8:
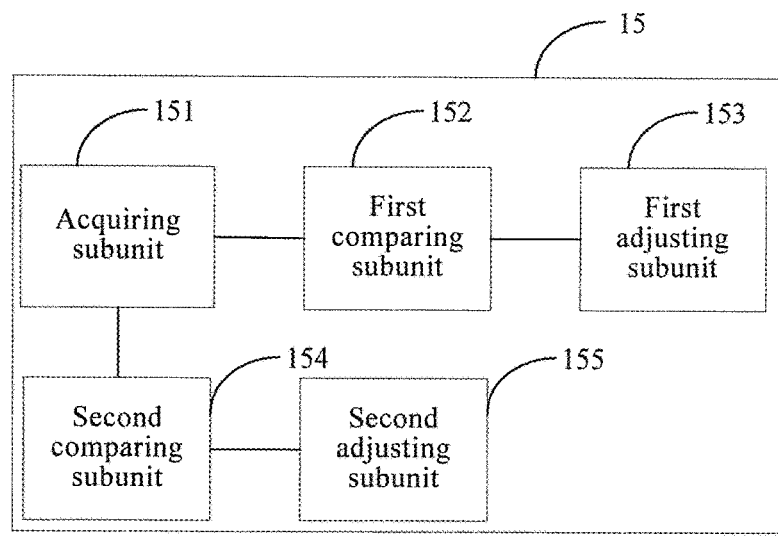
FIG. 8 is a schematic structural diagram of a data sharing apparatus according to an embodiment of the present invention.

In this embodiment of the present invention, an adjusting process of the adjusting unit 15 may be as follows: an initial value of the intimacy degree is set for the second terminal; when the quantity of times of evaluation increases to a threshold, the intimacy degree is increased by 1, and when the intimacy degree increases to a threshold, the second terminal is moved to a sharing group; when the quantity of times of evaluation decreases to a threshold, the intimacy degree is decreased by 1, and when the intimacy degree decreases to a threshold, the second terminal is moved to another sharing group, so that a larger quantity of times of evaluation leads to a higher intimacy degree, and corresponding sharing groups are different. Specifically, a structure shown in FIG. 8 may include an acquiring subunit 151, a first comparing subunit 152, a first adjusting subunit 153, a second comparing subunit 154, and a second adjusting subunit 155.

The acquiring subunit 151 is configured to acquire the quantity of times of evaluation performed by the second terminal allowed to obtain the shared data on the shared data or the previously acquired shared data.

The first comparing subunit 152 is configured to increase an intimacy degree of the terminal if the quantity of times of evaluation increases to a first evaluation threshold.

The first adjusting subunit 153 is configured to: in a case in which an increased intimacy degree obtained by increasing an intimacy degree in the first comparing subunit reaches a first intimacy threshold, adjust a second terminal corresponding to the increased intimacy degree to a corresponding sharing group.

The second comparing subunit 154 is configured to decrease an intimacy degree of the terminal if the quantity of times of evaluation decreases to a second evaluation threshold.

The second adjusting subunit 155 is configured to: in a case in which a decreased intimacy degree obtained by decreasing an intimacy degree in the second comparing subunit reaches a second intimacy threshold, adjust a second terminal corresponding to the decreased intimacy degree to a corresponding sharing group.

The foregoing first evaluation threshold, first intimacy threshold, second evaluation threshold, and second intimacy threshold may be set according to different application scenarios, and values thereof are not limited in this embodiment of the present invention. It should be noted that the adjusting unit 15 may perform adjustment only in a case in which the intimacy degree reaches the first intimacy threshold, or may perform adjustment only in a case in which the intimacy degree reaches the second intimacy threshold, which is not repeatedly described in the present invention.

According to the foregoing manners, dynamic adjustment of a sharing group is implemented, so that second terminals in a sharing group at different moments are different, and consequently when sending a same piece of shared data at different moments, the first terminal may send the same piece of shared data to the different second terminals, thereby sharing a same piece of shared data between different sharing objects.

In addition, in all the foregoing apparatus embodiments, the data sharing apparatus 10 provided by this embodiment of the present invention may further include a sharing manner selection unit, specifically configured to determine, according to a device parameter of a terminal, a sharing manner for sending the shared data; or determine, according to a data priority of the shared data, a sharing manner for sending the shared data; or obtain a total weighted value by performing weighting processing separately on a device parameter of a terminal and a data priority of the shared data, and compare the total weighted value with a threshold of each sharing manner, to obtain a sharing manner corresponding to the total weighted value. Specifically, for which sharing manner is determined according to which sharing factor (any one factor of the device parameter of the terminal, the data priority, and weighting of both the device parameter of the terminal and the data priority), reference may be made to the method embodiments.

The device parameter of the terminal includes at least one of an Internet access manner, an Internet speed, an electric quantity, and a fee, to determine the sharing manner corresponding to the device parameter, where the terminal is a first terminal that sends the shared data to the sharing group or a second terminal that receives the shared data and that is in the sharing group.

Figure 9:
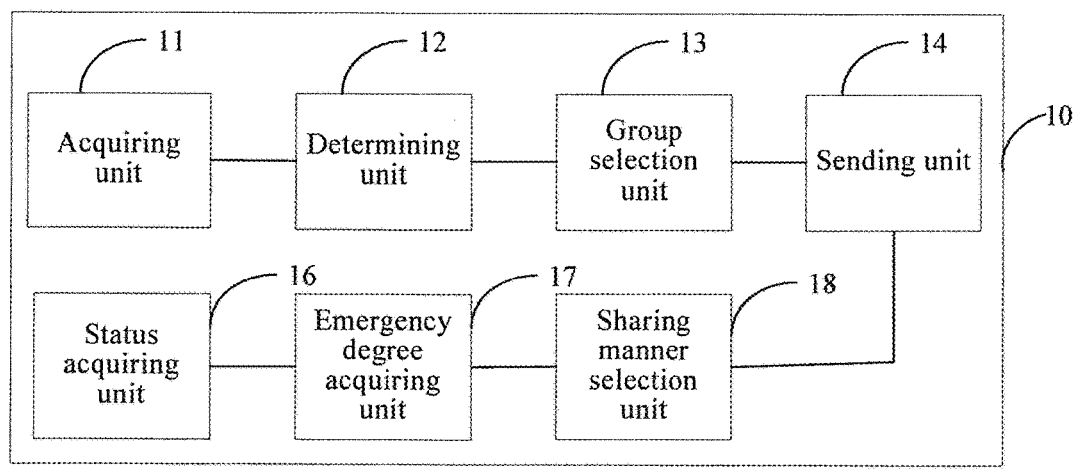
FIG. 9 is still another schematic structural diagram of a data sharing apparatus according to an embodiment of the present invention.

When the shared data is physical sign data, the data sharing apparatus 10 provided by this embodiment of the present invention may further include a state acquiring unit 16, an emergency degree acquiring unit 17, and a sharing manner selection unit 18, as shown in FIG. 9. FIG. 9 is still another schematic structural diagram, on a basis of FIG. 6, of a data sharing apparatus according to an embodiment of the present invention.

The state acquiring unit 16 is configured to determine a state of a user using a first terminal, where the user state is used to indicate a current state of the user. The state acquiring unit 16 may use an acceleration sensor to perceive a vibration condition of a device, so as to predict a user state, which is, for example, a static state, a walking state, a violent exercising state, or the like. When the first terminal collects the physical sign data autonomously, the device is the first terminal. When the first terminal acquires the physical sign data from a wearable terminal, the device is the wearable terminal.

Optionally, the state acquiring unit 16 may further precisely predict information about the user state according to a location at which the user is located, current time, and the predicted user state. For example, if it is perceived that the current time is 7 o'clock in the evening, and the user is currently located in a park, then the user state is walking state information, and further it may be predicted that the user is currently walking outdoors. The location in which the user is located may be acquired by using a GPS, a gyroscope, or WIFI on a collection device of physical sign data.

The emergency degree acquiring unit 17 is configured to determine an emergency degree of the shared data by using the user state.

It can be understood that, when the user is in different states, a difference may exist in the acquired physical sign data. Therefore, when a physical condition of the user is being analyzed, analysis further needs to be performed in combination with a current state in which the user is in. For example, when it is perceived that the user is in an outdoor walking state, comparison and analysis are performed on a normal physical sign indicator of a sharer in a normal walking state and the currently acquired physical sign data; if it is perceived that the user is in a violent exercising state, comparison and analysis are performed on a normal physical sign indicator of the user in a violent exercising state and the currently acquired physical sign data.

By performing analysis on physical sign data of the user in a current state and a normal physical sign indicator in the state, an emergency degree of the current physical sign data may be obtained, that is, whether the physical sign data is in an emergent sending state is determined.

The sharing manner selection unit 18 is configured to select a sharing manner corresponding to the emergency degree of the shared data. For example, when an emergency degree of the physical sign data indicates that the physical sign data is in an emergent sending state, the sharing manner selection unit 18 may use a sharing manner of using a telephone, and the sending unit 14 directly calls a second terminal that is located in an emergency center in a sharing group, and sends the physical sign data by using a telephone line. After the telephone is put through, the second terminal in the emergency center automatically plays the physical sign data.

Figure 10:
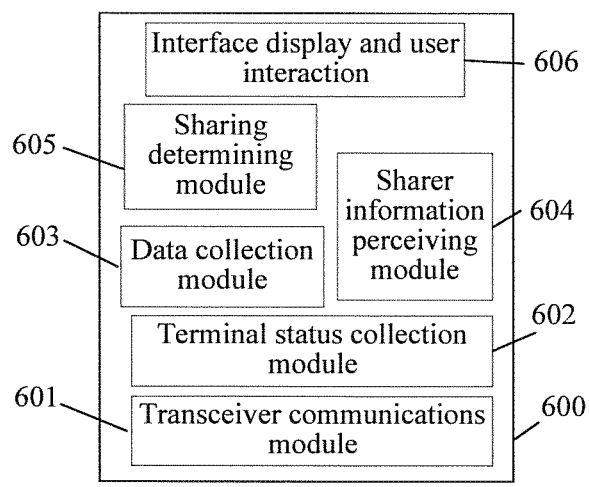
FIG. 10 is a schematic diagram of a terminal according to an embodiment of the present invention.

Referring to FIG. 10, FIG. 10 shows an internal module diagram of a terminal that supports automatic sharing of data according to an embodiment of the present invention. The terminal 600 may be a wearable terminal, such as a wearable watch, a wearable hand ring, a pair of wearable glasses, or a wearable ring, or may be a smartphone, a tablet computer, or the like.

601 represents a transceiver communications module of the terminal, and the transceiver communications module 601 is configured to send shared data to a sharing group, acquire shared data from another wearable terminal, and the like.

602 represents a state collection module of the terminal, and the state collection module is configured to collect a state of the terminal, for example, a network in which the terminal is located currently and an electric quantity of the terminal, so as to assist in determining a sharing manner.

603 represents a data collection module, which is configured to collect data. The data collection module may collect data by using multiple types of sensors. For example, a gravity sensor and an acceleration sensor are used for perceiving a user state, a GPS or the like is used for acquiring a location at which a user is located, namely a geographic location, a sensor that can measure a blood pressure is used for measuring a blood pressure of a sharer, and the like.

604 represents a sharer information perceiving module, which is configured to receive the data acquired from the data collection module 603, and perform identification and prediction according to the data, to obtain an environment in which a sharer is located, for example, a state of the sharer (a user of the terminal), a location at which the sharer is located, and physical sign data of the sharer. 605 represents a sharing determining module, which is configured to determine a sharing group and a sharing manner.

606 represents an interface display and sharer interaction module, which is configured to provide a GUI (Graphical User Interface, graphical user interface), can receive an operation instruction of the sharer, can also display the shared data and the state of the sharer, and the like. The operation instruction of the sharer may include an instruction of selecting, by the sharer, a second terminal from a sharing group, where the instruction is used for selecting, from the sharing group, the second terminal that can acquire the shared data.

Figure 11:
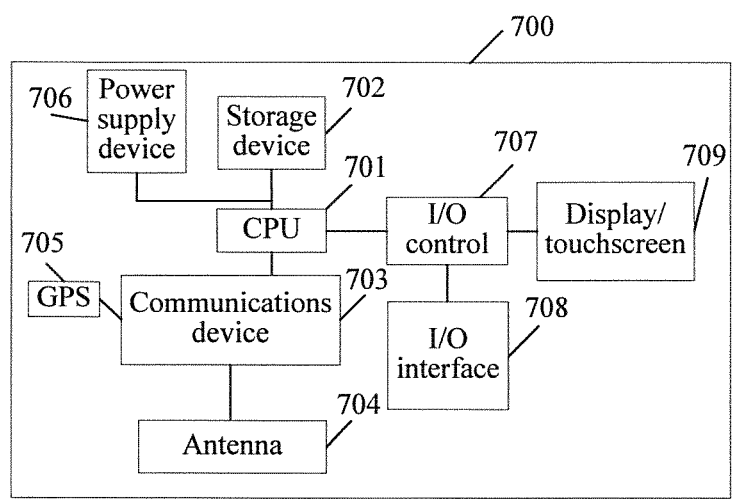
FIG. 11 is another schematic diagram of a terminal according to an embodiment of the present invention.

In addition, an embodiment of the present invention further provides another terminal 700. The terminal 700 can perform sharing of shared data, and a schematic structural diagram thereof is shown in FIG. 11.

701 represents a central processing unit, which is configured to control each hardware device of the entire terminal, and run operating system software and required application program software. The application program software running on the central processing unit 701 includes but is not limited to user state acquisition, sharing manner determining, terminal state collection, and the like that are involved in the embodiments of the present invention.

702 represents a storage device, which is configured to complete storage of various types of application program software of the terminal, storage of data, running of software, and the like, and may be one or more of a RAM (Random Access Memory), an EPROM (Erasable Programmable ROM, erasable programmable ROM), an SSD (Solid State Disk, solid state disk), an SD (Secure Digital Memory card). A software function of the data sharing method provided by the embodiments of the present invention may also run and be stored on the storage device 702.

703 represents a communications device, which is configured to provide a network communication function for the terminal, including one or more of a cellular network, a wireless local area network, Near Field Communication, Bluetooth, and the like. 704 represents an antenna used by the communications device 703. 705 represents a GPS module, which is configured to provide a geographic location of a user.

706 represents a power supply device, which is configured to provide direct current power supply for the terminal, or convert alternating current power supply into direct current power supply. 707 represents I/O (Input/Output, input/output) control, which is in the terminal and configured to control data interaction between various input and output devices, particularly data interaction between the central processing unit 701 and an I/O interface 708 as well as a touchscreen 709.

708 represents the I/O interface, which is configured to provide an external interface for the terminal, including one or more of a USB (Universal Serial Bus, Universal Serial Bus) interface, an SD card interface, a button interface.

709 represents the touchscreen, which is configured to display a software running state, a terminal state, a user operation interface, and an operation result on the terminal. The touchscreen 709 may further be configured to receive a touch operation of a user and convert the touch operation into a user operation instruction.

Figure 12:
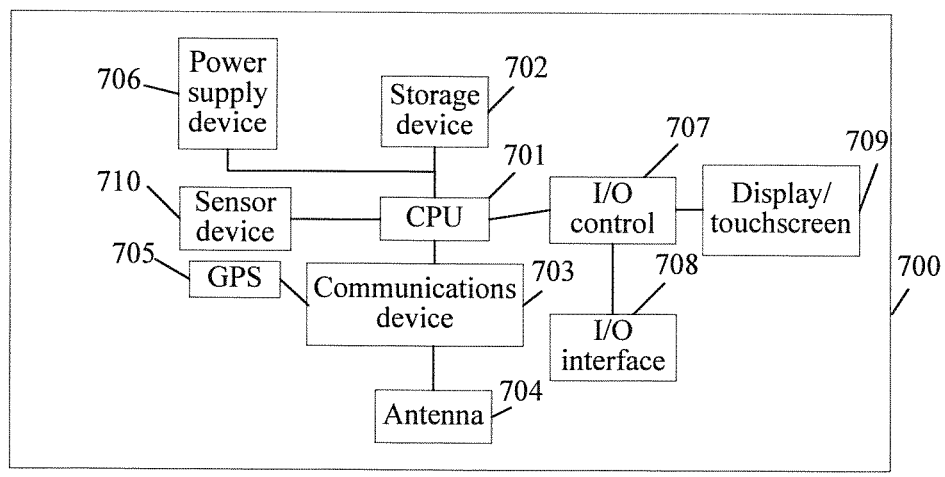
FIG. 12 is still another schematic diagram of a terminal according to an embodiment of the present invention.

On a basis of FIG. 11, an embodiment of the present invention further provides another terminal 700, which can collect shared data autonomously. As shown in FIG. 12, 710 represents a sensor device, which may include one or more of a gravity sensor, an acceleration sensor, a proximity sensor, a camera lens, an optical sensor, a blood pressure measurement sensor, a pulse measurement sensor, and the like. It should be noted that the embodiments in this specification are all described in a progressive manner, each embodiment focuses on a difference from other embodiments, and for same or similar parts in the embodiments, refer to these embodiments. An apparatus embodiment is basically similar to a method embodiment, and therefore is described briefly; for related parts, refer to partial descriptions in the method embodiment.

It should be noted that in this specification, relational terms such as first and second are only used to distinguish one entity or operation from another, and do not necessarily require or imply that any actual relationship or sequence exists between these entities or operations. Moreover, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element preceded by "includes a . . . " does not, without more constraints, preclude the existence of additional identical elements in the process, method, article, or apparatus that includes the element.

For ease of description, the preceding apparatuses are divided into a variety of units according to functions for separate description. Certainly, when this invention is implemented, the functions of each of the units can be implemented in a same or multiple pieces of software and/or hardware.

Based on the foregoing descriptions of the implementation manners, a person skilled in the art may clearly understand that the present application may be implemented by software in addition to a necessary general hardware platform. Based on such an understanding, the technical solutions of the present invention essentially or the part contributing to the prior art may be implemented in a form of a software product. The software product may be stored in a storage medium, such as a ROM/RAM, a magnetic disk, or an optical disc, and includes several instructions for instructing a computer device (which may be a personal computer, a server, or a network device) to perform the methods described in the embodiments or some parts of the embodiments of the present invention.

The foregoing describes a data sharing method and apparatus, and a terminal that are provided in the present invention in detail. Specific examples are used herein to describe the principle and the implementation manners of the present invention, and the description of the foregoing embodiments is merely used to help the understanding of the methods and core ideas of the present invention; in addition, a person of ordinary skill in the art can make modifications and variations to the specific implementation manners and application scope according to the ideas of the present invention. In summary, the content of the specification shall not be constructed as a limitation to the present invention.

What is claimed is:

1. A data sharing method, comprising:
   acquiring shared data, wherein the shared data is data used to be shared with another person, and wherein the shared data includes at least one piece of physical sign data of a sharer of the shared data, the physical sign data being exclusive of geographic location data of the sharer;
   determining a privacy degree of the shared data;
   determining a sharing group of the shared data according to the privacy degree, wherein the sharing group is a group that receives the shared data and comprises a second terminal allowed to obtain the shared data; and
   sending the shared data to the sharing group, wherein when the shared data is the at least one piece of physical sign data, the method further comprises:
      determining a state of a user using a first terminal, wherein the user is the sharer of the shared data and the user state is used to indicate a current state of the user, and the first terminal of which the user state is determined is the first terminal that sends the shared data and that is in the sharing group;
      determining an emergency degree of the shared data by analyzing the physical sign data according to the user state, wherein the emergency degree is one of at least an emergent state and a non-emergent state; and
      selecting a sharing manner corresponding to the emergency degree of the shared data, wherein the sharing manner is one of at least a first sharing manner corresponding to the emergent state and a second sharing manner corresponding to the non-emergent state and sending the shared data to the sharing group further comprises sending the shared data using the one of the at least first and second sharing manners corresponding to the emergency degree of the shared data.

2. The method according to claim 1, further comprising:
   adjusting the sharing group according to an intimacy degree with the second terminal allowed to obtain the shared data, wherein the intimacy degree is determined according to a quantity of times of evaluation performed by the second terminal allowed to obtain the shared data on the shared data or previously acquired shared data.

3. The method according to claim 2, wherein adjusting the sharing group according to an intimacy degree with the second terminal allowed to obtain the shared data comprises:

acquiring the quantity of times of evaluation performed by the second terminal allowed to obtain the shared data on the shared data or previously acquired shared data, and increasing an intimacy degree of the second terminal if the quantity of times of evaluation increases to a first evaluation threshold; and if an increased intimacy degree reaches a first intimacy threshold, adjusting the second terminal corresponding to the increased intimacy degree to a corresponding first new sharing group; or decreasing an intimacy degree of the second terminal if the quantity of times of evaluation decreases to a second evaluation threshold; and if a decreased intimacy degree reaches a second intimacy threshold, adjusting the second terminal corresponding to the decreased intimacy degree to a corresponding second new sharing group.

4. The method according to claim 1, further comprising:
determining, according to a device parameter of a terminal, the sharing manner for sending the shared data; or
determining, according to a data priority of the shared data, the sharing manner for sending the shared data; or
obtaining a total weighted value by performing weighting processing separately on the device parameter of the terminal and the data priority of the shared data, and comparing the total weighted value with a threshold of each sharing manner, to obtain the sharing manner corresponding to the total weighted value.

5. The method according to claim 4, wherein the device parameter of the terminal comprises at least one of an Internet access manner, an Internet speed, an electric quantity, and a fee, to determine the sharing manner corresponding to the device parameter, wherein the terminal is a first terminal that sends the shared data to the sharing group or a second terminal that receives the shared data and that is in the sharing group.

6. The method according to claim 1, wherein determining the state of the user using the first terminal comprises:
using the acquired user state directly as the user state of the first terminal that sends the shared data; or
acquiring a location at which the user of the first terminal that sends the shared data is located and a current time while acquiring the user state of the first terminal that sends the shared data, and determining a final user state according to the location at which the user is located, the current time, and the user state.

7. The method according to claim 1, wherein determining a privacy degree of the shared data comprises:
identifying, by using a text identification technology and a picture identification technology, shared content comprised in the shared data, and determining, according to an information confidentiality degree of the shared content, a privacy degree corresponding to the shared data; or
determining, by using a data type of the shared data, a privacy degree corresponding to the data type.

8. A data sharing apparatus, comprising:
an acquiring unit, configured to acquire shared data, wherein the shared data is data used to be shared with another person, and wherein the shared data includes at least one piece of physical sign data of a sharer of the shared data, the physical sign data being exclusive of geographic location data of the sharer;
a determining unit, configured to determine a privacy degree of the shared data;

a group selection unit, configured to determine a sharing group of the shared data according to the privacy degree, wherein the sharing group is a group that receives the shared data and comprises a terminal allowed to obtain the shared data; and
a sending unit, configured to send the shared data to the sharing group, and wherein when the shared data is the at least one piece of physical sign data, the apparatus further comprises:
a state acquiring unit, configured to determine a state of a user using a first terminal, wherein the user is the sharer of the shared date and the user state is used to indicate a current state of the user, and the first terminal of which the user state is determined is the first terminal that sends the shared data and that is in the sharing group,
an emergency degree acquiring unit, configured to determine an emergency degree of the shared data by analyzing the physical sign data according to the user state, wherein the emergency degree is one of at least an emergent state and a non-emergent state, and
a sharing manner selection unit, configured to select a sharing manner corresponding to the emergency degree of the shared data, wherein the sharing manner is one of at least a first sharing manner corresponding to the emergent state and a second sharing manner corresponding to the non-emergent state.

9. The apparatus according to claim 8, further comprising:
an adjusting unit, configured to adjust the sharing group according to an intimacy degree with the second terminal allowed to obtain the shared data, wherein the intimacy degree is determined according to a quantity of times of evaluation performed by the second terminal allowed to obtain the shared data on the shared data or previously acquired shared data.

10. The apparatus according to claim 9, wherein the adjusting unit comprises:
an acquiring subunit, configured to acquire the quantity of times of evaluation performed by the second terminal allowed to obtain the shared data on the shared data or previously acquired shared data,
a first comparing subunit, configured to increase an intimacy degree of the second terminal if the quantity of times of evaluation increases to a first evaluation threshold, and
a first adjusting subunit, configured to: in a case in which an increased intimacy degree obtained by increasing an intimacy degree in the first comparing subunit reaches a first intimacy threshold, adjust the second terminal corresponding to the increased intimacy degree to a corresponding first new sharing group; or
a second comparing subunit, configured to decrease an intimacy degree of the second terminal if the quantity of times of evaluation decreases to a second evaluation threshold, and
a second adjusting subunit, configured to: in a case in which a decreased intimacy degree obtained by decreasing an intimacy degree in the second comparing subunit reaches a second intimacy threshold, adjust the second terminal corresponding to the decreased intimacy degree to a corresponding second new sharing group.

11. The apparatus according to claim 8, further comprising:
a sharing manner selection unit, configured to:
determine, according to a device parameter of a terminal, the sharing manner for sending the shared data, or determine, according to a data priority of the shared data, the sharing manner for sending the shared data, or obtain a total weighted value by performing weighting processing separately on the device parameter of the terminal and the data priority of the shared data, and compare the total weighted value with a threshold of each sharing manner, to obtain the sharing manner corresponding to the total weighted value.

12. The apparatus according to claim 11, wherein the device parameter of the terminal comprises at least one of an Internet access manner, an Internet speed, an electric quantity, and a fee, to determine the sharing manner corresponding to the device parameter, wherein the terminal is a first terminal that sends the shared data to the sharing group or a second terminal that receives the shared data and that is in the sharing group.

13. The apparatus according to claim 8, wherein the state acquiring unit is configured to:

use the acquired user state directly as the user state of the first terminal that sends the shared data; or acquire a location at which the user of the first terminal that sends the shared data is located and a current time while acquiring the user state of the first terminal that sends the shared data, and determine the final user state according to the location at which the user is located, the current time, and the user state.

14. The apparatus according to claim 8 wherein the determining unit is configured to:

identify, by using a text identification technology and a picture identification technology, shared content comprised in the shared data, and determine, according to an information confidentiality degree of the shared content, a privacy degree corresponding to the shared data; or determine, by using a data type of the shared data, a privacy degree corresponding to the data type.

15. A terminal, comprising:

a transceiver, configured to send shared data to a sharing group and acquire shared data from another wearable terminal;

a processor, configured to:

collect a state of the terminal to assist in determining a sharing manner, collect shared data, wherein the shared data includes at least one piece of physical sign data of a sharer of the shared data, perform identification and prediction according to the at least one piece of physical sign data to obtain a state of the sharer of the shared data that is the user of the terminal, and determine a sharing group and a sharing manner; wherein the sharing manner is one of at least a first sharing manner corresponding to a first state of the sharer of the shared data and a second sharing manner corresponding to a second state of the sharer of the shared data; and a touchscreen, configured to provide a graphical user interface.

* * * * *